PULSE WIDTH MODULATION REPRESENTATION OF PAIRED BINARY DIGITS

Filed Dec. 21, 1962 3 Sheets-Sheet 1

INVENTORS.
RICHARD B. LAWRANCE
BY JOHN E. MEKOTA, Jr.
Fred Jacob
ATTORNEY

PULSE WIDTH MODULATION REPRESENTATION OF PAIRED BINARY DIGITS

Filed Dec. 21, 1962 3 Sheets-Sheet 2

INVENTORS.
RICHARD B. LAWRANCE
BY JOHN E. MEKOTA, Jr.
Fred Jacob
ATTORNEY

INVENTORS.
RICHARD B. LAWRANCE
BY JOHN E. MEKOTA, Jr.
Fred Jacob
ATTORNEY 3,281,806

PULSE WIDTH MODULATION REPRESENTATION OF PAIRED BINARY DIGITS

Richard B. Lawrance, Winchester, and John E. Mekota, Jr., Belmont, Mass., assignors to Honeywell Inc., a corporation of Delaware Filed Dec. 21, 1962, Ser. No. 246,508
30 Claims. (Cl. 340—174.1)

The present invention relates in general to a new and improved binary information storage record and to a new and improved method and apparatus for producing and utilizing the same. The storage record which forms a part of the present invention is characterized by its efficient use of record space and by the improved reliability with which recorded information can be recovered.

In general, digital information which is composed of binary ONES and ZEROS, is recorded on a storage medium by storing in the medium two distinct kinds of indicia which are respectively representative of ONES and ZEROS. In the case of a magnetic storage medium, the record is generated by energizing the medium with pulsed flux signals representative of the binary digits which then produce corresponding magnetic indicia in the medium. It is generally desirable to record the maximum amount of information on a given length of storage medium. Not only must the cost of the medium itself be considered, but also the time required to move it past the recording and readout station. A high data storage density will thus serve to reduce the cost of data storage.

Given the state of the art existing at any time in the recording field, there exists a minimum spacing beyond which the recorded indicia are either indistinguishable, or are not sufficiently distinct to permit the recovery of the stored information from the record with an adequate degree of reliability. In the case of magnetic recording, where pulses of opposite polarity are applied to the magnetic recording head in order to produce the desired magnetic indicia on the storage medium, the minimum distinguishable distance between recorded opposite polarity reversals constitutes one of the limiting factors as regards the storage density of data in the medium. The aforesaid polarity reversals are also referred to as transitions or zero crossovers depending upon whether the magnetic indicia in the medium or the representative signal waveform for producing the magnetic indicia is meant.

It will be clear that the aforesaid minimum distinguishable distance between opposite polarity reversals will vary with the apparatus employed. For example, by improving the resolution of the recording head, by decreasing the spacing between the recording head and the storage medium, or by decreasing the speed of the storage medium relative to the magnetic recording head, improvements may be effected in the achievable storage density at which data may be reliably recovered. However, for a given apparatus operating under optimum conditions, the minimum distinguishable distance which limits the data storage density, i.e. the recorded digits per linear inch of storage medium, is fixed.

It will be clear that a useful data processing system must not only be capable of storing information at high densities, but must enable the user to recover the stored information with a high degree of reliability. It is often important that the medium be read or recorded by a large variety of data processing systems, some of which must be very inexpensive. Such a requirement necessitates the use of relatively simple equipment, particularly where information is stored in a plurality of channels of the storage medium. Simplicity of construction of the recording and readout equipment is also desirable from the point of view of the initial cost of acquisition and in order to reduce the cost of the required maintenance.

In an efficient binary digital information record opposite polarity reversals are spaced to the maximum possible extent at the aforesaid minimum distinguishable distance. While a useful data storage system will produce a minimum amount of errors in recording or in recovering the information, such errors will nevertheless occur in practice. It is therefore highly valuable to produce a record in which recording or readback errors are inherently detectable by the use of simple equipment. Moreover, it is advantageous if the record can be recorded or read by a variety of data processing systems, some of which may be relatively inexpensive and hence simple in construction.

Among the recording techniques which are presently in use, the most efficient magnetic tape usage occurs where binary ONES and binary ZEROS are solely determined by the duration of a pulse, regardless of polarity. In this technique a binary ZERO is represented by a waveform, either positive or negative, which encompasses a single unit of the aforesaid minimum distinguishable distance, hereinafter referred to as MDD. A binary ONE on the other hand is represented by a waveform which covers two minimum distinguishable distance units. The storage cell required for each binary digit has a length of 2 MDD. Although such a technique is highly efficient in the manner in which the available space in the storage medium is used, it poses severe buffer problems, particularly where the information is stored in and read out from a plurality of data channels. This is due to the fact that the length of a given record in each channel is completely unpredictable and depends entirely on the number of binary ZEROS and ONES present in the information which is to be recorded. Thus, if a separate frame of data is recorded serially in each channel, a relatively long pause may be required in order to permit the collection of the binary digits in each channel for corresponding data frames which are to be read out in synchronism. A severe requirement is thus imposed on the buffer which is used for the collection of the binary digits. As a consequence, the reliability of the data readout operation is compromised and the cost of such a system is increased substantially. Such a technique further requires the use of clock pulses which are usually recorded in a separate channel. Due to such problems as skewing of the storage medium, or the misalignment of the magnetic heads in the respective channels, the clock pulses may be out of synchronism with the data which is read out. This again limits the degree of reliability with which stored data can be recovered.

Another recording technique which is presently in use also requires 2 MDD for each storage cell of the medium which contains a binary digit. In this case, a binary ZERO is represented by the absence of a polarity reversal, i.e. by the failure of the representative signal waveform to cross the zero line within the storage cell. If a binary ONE is represented, a zero crossover occurs centrally of the storage cell. At the limits of each storage cell, i.e. at a spacing of 2 MDD, a polarity reversal is always required for synchronization purposes.

While in the last-described technique there are no serious buffering problems in synchronizing the information obtained from the respective data channels, no use is made of the polarity of the recorded signals. A synchronizing polarity reversal is required periodically at a spacing of 2 MDD, regardless of the binary digit represented. Oppositely directed polarity reversals may thus represent the same binary digit. As a consequence, the readout equipment required is far more complex than is consistent with reliable data readout.

A third technique which is in common use today similarly stores each binary digit in a storage cell having a length of 2 MDD. In this system, the direction of the polarity reversal determines whether or not a given digit is a binary ONE or a binary ZERO. The salient disadvantage of such a system is the requirement for alternation polarity reversals which must be inserted whenever like binary digits appear in succession. Since the physical characteristics of these alternation crossovers do not distinguish from those which denote a stored binary digit, special equipment is required to keep track of such cases. The function of this special equipment is to disregard a crossover, regardless of polarity, which occurs intermediate a pair of like binary digits. It will be apparent that timing considerations play an important part in such equipment thereby lessening the reliability of data readout.

From the foregoing discussion it will be apparent that the severe operating requirements imposed by the respective recording techniques call for relatively complex apparatus and thus they tend to compromise the reliability of data recovery. Timing considerations are particularly important during the data readout and are readily upset by variations in the speed of the storage medium past the readout station. As a consequence, data storage densities which are theoretically attainable are difficult to achieve in practice. Unless the equipment is operating under optimum conditions at all times, reliable data readout can be attained only at storage densities far less than those corresponding to a storage cell dimension of 2 MDD.

A further property which is frequently desirable in recording systems, particularly in systems which employ magnetic tape as the storage medium, is the ability to read out recorded information with the tape moving either in a forward or in a backward direction. It will be obvious that great time savings can be achieved in this manner which are reflected in the increased data-handling capacity of the equipment. Although it is possible in the above-mentioned prior art systems to read out the recorded magnetic indicia in the reverse direction, the reliable recognition of the characters imposes additional requirements on the associated readout apparatus which further increase the complexity of the equipment.

It is the primary object of the present invention to provide improved data handling techniques which will overcome the foregoing disadvantages.

It is a further object of the present invention to provide a storage record wherein polarity and pulse duration unequivocally determine the nature of the stored digit without reference to an external timing source.

It is another object of the present invention to provide a storage record which, by means of a simple technique can be read in opposite directions.

It is an additional object of the present invention to provide a method for reliably storing binary digital data on a record at high densities and for recovering the information with a high degree of reliability.

It is still a further object of the present invention to provide a method for storing binary data in a format amenable to the detection, by simple means, of the occurrence of almost all errors in reading the data, whether caused by faults in the recording medium or equipment, by mechanical separation of the medium and the head, by weak signals on the medium, by foreign matter on the medium or reading equipment, by other mechanical faults, by failure of the detecting equipment, or otherwise.

It is still another object of the present invention to provide apparatus for reliably recording binary digital information at high densities on a storage medium.

It is yet another object of the present invention to provide apparatus for reliably recovering binary digital information stored on a record at high densities.

In the present invention, the foregoing objects are carried out by treating the binary information in terms of digit pairs. A pulse signal is generated for each of the four possible combinations of a pair of binary digits. The pulse signals are recorded in the form of magnetic indicia in substantially identical cells of the storage medium in accordance with the combination formed by the incoming pair of binary information digits. Each of the aforesaid storage cells has a length of 4 MDD. The leading edge of a pulse, the polarity of which remains the same for each of the four combinations, defines the beginning of each storage cell. The duration of the pulse determines the combination of the binary digit pair represented.

Accordingly, the spacing between the leading and lagging edges of each of the aforesaid predetermined polarity pulses, i.e. between opposite polarity reversals, uniquely determines the digit pair represented. Since the leading pulse edge in each instance acts as a synchronizing pulse of a predetermined polarity, no external clock source is required for the readout of the recorded information. The readout operation therefore requires only relatively simple apparatus and hence it may be carried out with a high degree of reliability.

These and other novel features of the invention together with further objects and advantages thereof will become apparent from the following detailed specification with reference to the accompanying drawings in which.

Figures 1, 2:
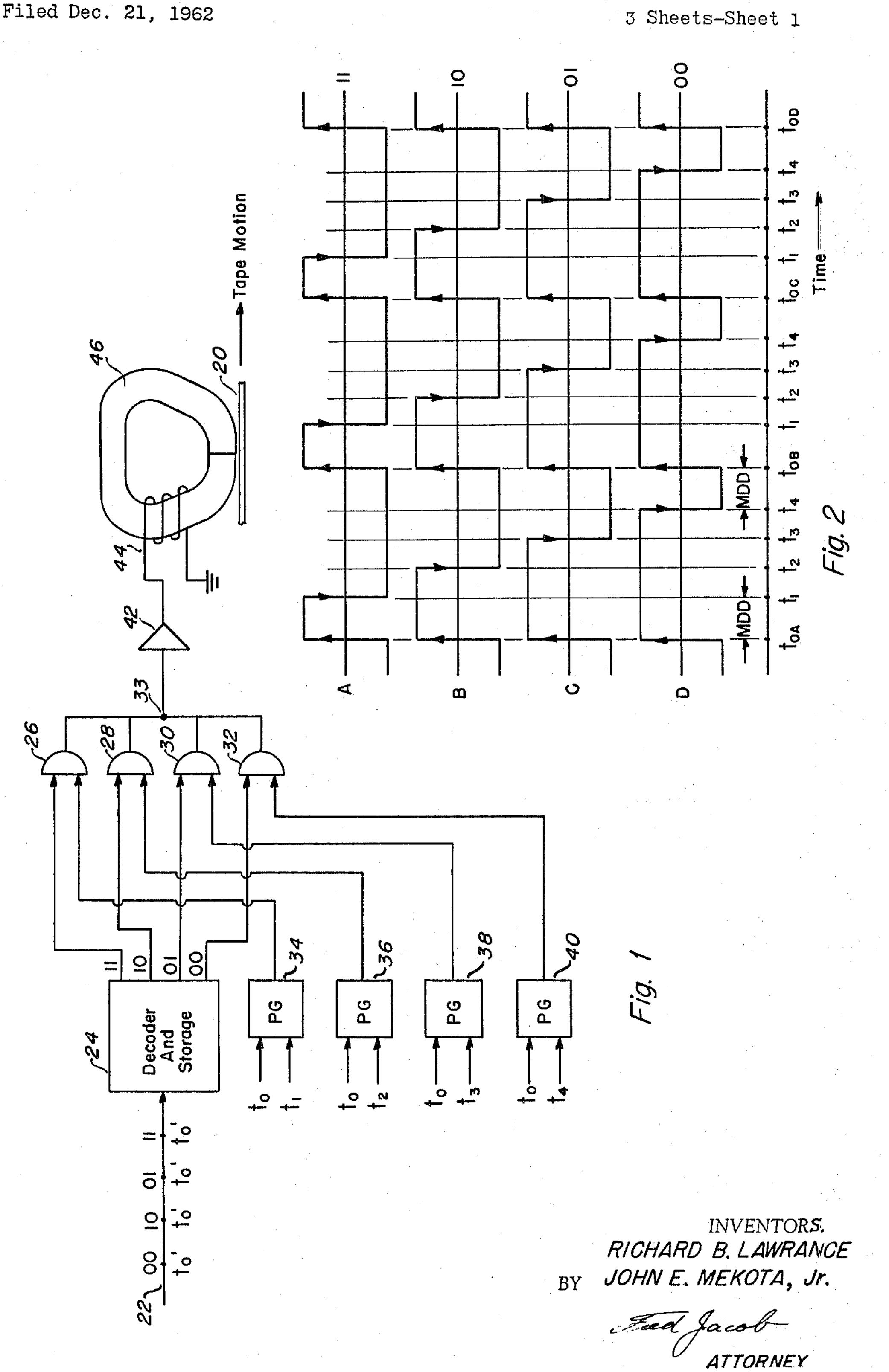
FIGURE 1 illustrates one embodiment of the recording apparatus which forms a part of the present invention.
FIGURE 2 illustrates idealized waveforms produced by the different pulse generators of the apparatus of FIGURE 1 in accordance with a preferred embodiment of the invention.

With reference now to the drawings, FIGURE 1 illustrates one embodiment of apparatus for recording the incoming binary digital information on a storage medium such as the magnetic tape 20. For the purpose of illustration, a single input channel 22 is shown wherein the input data arrives in serial form to be recorded serially in a corresponding channel on the tape. It will be understood that information may also be recorded in a plurality of channels on the magnetic tape 20.

The incoming information is received by a decoder and storage unit 24 which has four outputs, each representative of one possible combination of a pair of binary digits. As indicated in FIGURE 1, these combinations are assigned values 11, 10, 01, and 00. The four outputs of the decoder and storage unit 24 thus define four sub-channels which are associated with the data channel 22. The sub-channels include gating means 26, 28, 30 and 32 respectively, each having one input leg connected to a corresponding output of the unit 24. Four pulse generators 34, 36, 38 and 40 respectively, are associated with the four sub-channels, each pulse generator having its output connected to a second input leg of the corresponding gating means in the associated sub-channel. The outputs of the gating means 26, 28, 30 and 32 are buffered to the input of an amplifier 42 whose output is connected to an input winding 44 of a magnetic recording head 46. The latter is adapted to record digital information in the aforesaid tape channel which corresponds to the data channel 22.

The operation of the apparatus of FIGURE 1 will be explained with reference to the waveforms illustrated in FIGURE 2. It will be understood that only one possible assignment of code combinations is illustrated with respect to the waveforms of FIGURE 2, the code assignment chosen permitting reverse reading of the information by a simple complementation of all bits. Other assignments of each combination, however, are also susceptible to simple reverse readout techniques and are similarly valuable. Let it be supposed that it is desired to record the binary digit sequence 1110010 on the tape 20. Under the control of an external clock, the respective digits of the sequence arrive in pairs at the input of the unit 24, at the clock time $t_0'$. As shown in FIGURE 1, the respective digits of the input data are paired as follows: 11, 10, 01 and 00. It will be noted that a ZERO has been added to the last digit of the sequence. In accordance with the convention adopted herein, a binary ZERO is inserted wherever a blank would normally occur.

The action of the unit 24 is such that one of its four outputs is energized in accordance with the particular combination formed by the digit pair received at its input. When the combination 11 arrives at the input, the appropriately labeled output of the decoder and storage unit 24 will be active to apply a corresponding signal to one input leg of the gate 26. Similar actions occur with respect to the other outputs of the unit 24 upon the arrival of the appropriate digit pair of the input data sequence.

At time $t_0$, a predetermined interval after the appearance of each clock pulse at time $t_0'$, a clock pulse is applied to each of the pulse generators 34, 36, 38 and 40. The time interval chosen is sufficient to accommodate the delay occasioned by the decoder storage unit 24 in providing the appropriate signals at the outputs thereof. As shown in FIGURE 2A which illustrates the output signal waveform of the pulse generator 34, the action of the clock pulse at time $t_0$ initiates a positive output pulse which is applied to the other input leg of the gate 26. In order to distinguish between the successive clock pulses at times $t_0$, a further letter subscript has been added in each instance in FIGURE 2. Thus, at time $t_{0A}$ the waveform which is illustrated in FIGURE 2A displays a positive zero crossover to initiate a positive pulse whose duration is determined by the occurrence of another clock pulse applied to the pulse generator 34 at time $t_1$ thereafter. The waveform of FIGURE 2A remains negative until, at time $t_{0B}$, the pulse generator 34 is again activated and a positive pulse is initiated by means of a positive zero crossover. At time $t_1$ thereafter, a negative zero crossover terminates the pulse. The process is repeated indefinitely as indicated at times $t_{0A}$, $t_{0B}$, $t_{0C}$ and $t_{0D}$.

Under the assumed operating conditions of the apparatus herein disclosed, the waveform which is illustrated in FIGURE 2A between $t_{0A}$ and $t_{0B}$ is taken as a representation of the binary digit combination 11. Referring again to the apparatus of FIGURE 1, the occurrence of a positive pulse of the aforesaid pulse signal between $t_0$ and $t_1$ will serve to render the gate 26 conductive in conjunction with the signal received at the other gate input leg from the corresponding output of the unit 24. Accordingly, a pulse of corresponding duration, and hence one that is representative of the combination 11, is applied to the input winding 44 of the magnetic recording head 46 by way of the pulse amplifier 42. The resultant flux flow in the magnetic head 46 will record corresponding magnetic indicia on the magnetic tape 20.

In order for the data sequence to be serially recorded in the tape channel, the tape must be moved at a uniform rate with respect to the recording head 46. This is indicated by the arrow labeled "Tape Motion" in FIGURE 1. As previously explained, with any given apparatus there exists a minimum distance at which opposite polarity crossovers can be distinguished while still providing reliable data readout of the storage record. If opposite zero crossovers of the waveform of FIGURE 2A are to be recorded at a spacing of MDD as shown, the time interval $t_0$–$t_1$ is determined by the tape speed.

FIGURE 2B illustrates the representative waveform of the pulse signal which is provided by the pulse generator 36. As in the case of the waveform shown in FIGURE 2A, a positive pulse is initiated by a clock pulse at time $t_0$. The pulse is terminated by another clock pulse which is applied to the pulse generator 36 at time $t_2$, the resultant spacing of the opposite zero crossovers between $t_0$ and $t_2$ being 5/3 MDD. The action is repeated, each pulse being initiated by a positive zero crossover at the time $t_0$ and being terminated by a negative zero crossover at time $t_2$. In the present embodiment of the invention, the waveform which appears between successive times $t_0$, such as between times $t_{0A}$ and $t_{0B}$ is representative of the binary digit combination 10.

FIGURE 2C illustrates the representative waveform for the binary digit combination 01 which is derived at the output of the pulse generator 38 in response to clock pulses applied at times $t_0$ and $t_3$. The resultant waveform includes a positive pulse whose duration, as determined by a pair of opposite polarity zero crossover, is 7/3 MDD. As before, the synchronizing zero crossover which initiates the pulse occurs at time $t_0$.

In a similar manner, the pulse generator 40 provides an output signal in response to the clock pulses applied to its input at time $t_0$ and $t_4$. The representative waveform of the aforesaid output signal, which corresponds to the binary digit combination 00, is illustrated in FIGURE 2D and is seen to contain positive pulses of a duration 9/3 MDD. It will be noted that the pulses of the latter waveform have a terminating zero crossover which has a spacing of 1 MDD from the initiating zero crossover of the subsequent pulse.

In accordance with the input data arriving from the data channel 22, the binary digit combination 10 follows the previous digit combination 11 at the input of decoding storage unit 24. The data flow in the input channel 22 is assumed to be from left to right, and hence the digit combination must be read from right to left with reference to the unit 24. In the instant case, the output which is labeled 10 will become active to apply a signal to one input leg of the gate 28. The latter further receives a pulse signal from the pulse generator 36 whose representative waveform is illustrated in FIGURE 2B. Accordingly, the gate 28 will become conductive between $t_0$ and $t_2$ and the winding 44 will be energized by a pulse signal having a waveform as shown in FIGURE 2B. The responsive magnetic flux flow in the magnetic recording head 46 will record corresponding magnetic indicia on the moving storage tape 20.

The subsequent arrival of the digit combination 01 at the input of the decoder and storage unit 24 renders the corresponding output of the latter active so that the gate 30 will pass the signal derived from the output of the pulse generator 38. This output signal, which is represented by the waveform shown in FIGURE 2C, is applied to the input winding 44 of the magnetic head 46 to record corresponding magnetic indicia on the tape 20. The above-mentioned data sequence is completed by the arrival of the binary digit combination 00 at the decoder 24. As the appropriate output of the latter becomes active, the gate 32 in the last sub-channel becomes conductive and applies the pulse signal derived from the pulse generator 40, which is represented in FIGURE 2D, to the magnetic head winding 44 to be recorded on the magnetic tape 20.

The composite representative waveform which appears at the common buffer output terminal 33 in FIGURE 1, is illustrated in FIGURE 3A. It will be seen that the binary digit combination 11 is represented by the waveform 3A between $t_{0A}$ and $t_{0B}$. A positive zero crossover indicative of the beginning of a digit combination occurs at time $t_{0A}$. The waveform portion under discussion further includes a negative zero crossover at time $t_1$ which is spaced from the positive crossover at time $t_{0A}$ a distance that is characteristically different for each of the four possible digit combinations. In the instant case, the characteristic distance between the pair of opposite zero crossovers is equal to 1 MDD.

The binary digit combination 10 is represented by the waveform of FIGURE 3A between the positive synchronizing zero crossovers at $t_{0B}$ and $t_{0C}$. The characteristic spacing of the negative zero crossover from the positive zero crossover at time $t_{0B}$, which initiates the waveform portion under consideration, is 5/3 MDD. The binary digit combination 01 which is represented between $t_{0C}$ and $t_{0D}$ in FIGURE 3A, has a negative zero crossover with a characteristic spacing of 7/3 MDD from the positive zero crossover at time $t_{0C}$ which initiates this particular waveform portion. The waveform portion which is representative of the last digit combination 00 of the digit sequence, is initiated by a positive zero crossover at time $t_{0D}$. The subsequent negative zero crossover at time $t_4$ has a characteristic spacing from the initiating positive zero crossover of 9/3 MDD. It will be further noted, that the last-recited negative zero crossover is spaced 1 MDD from its succeeding positive zero crossover.

Figure 3:
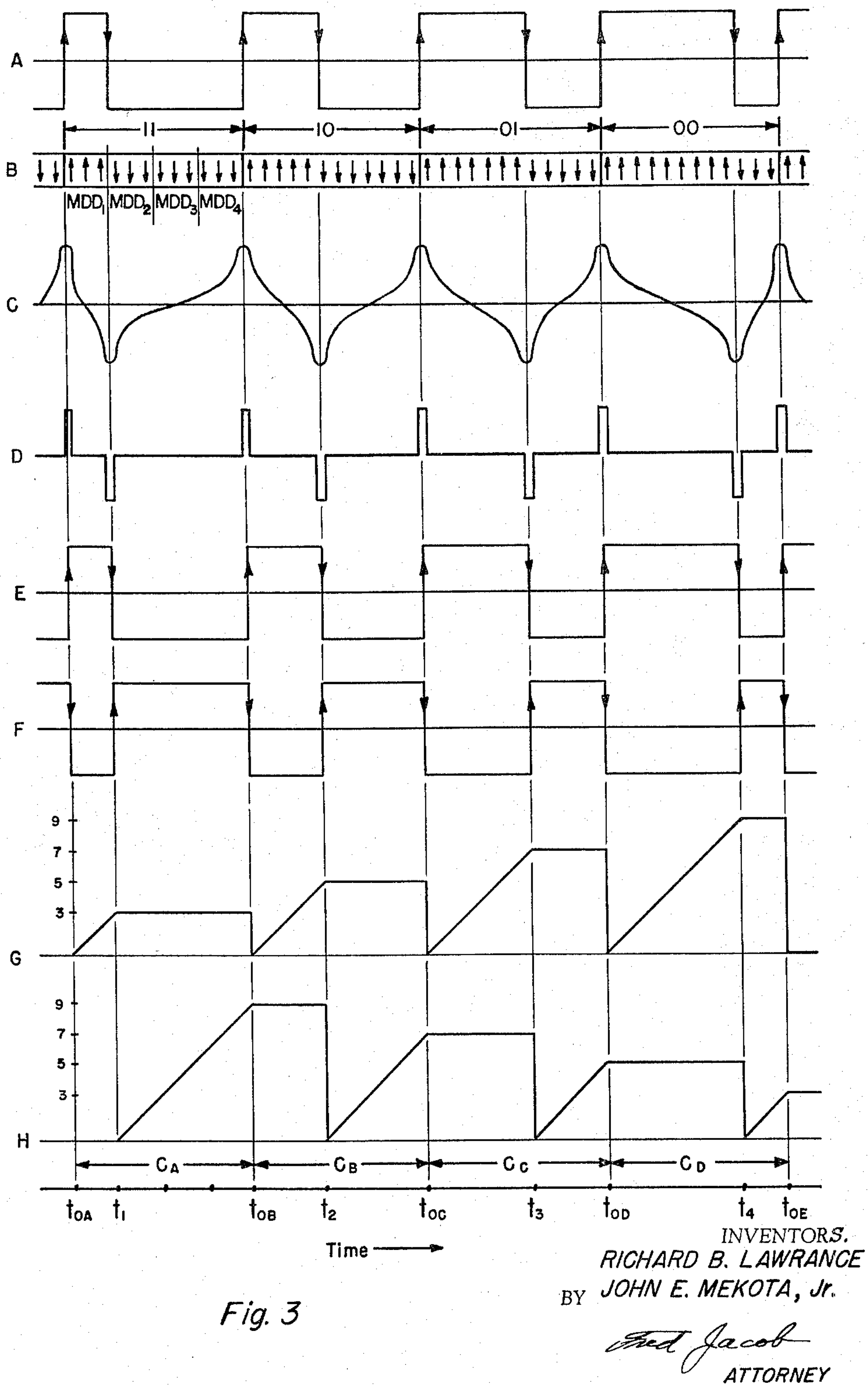
FIGURE 3 illustrates a preferred embodiment of a record which forms a part of the present invention as well as an idealized composite waveform for recording the different binary digit combinations to produce the record, and representative idealized waveforms obtained during the readout thereof.

FIGURE 3B illustrates the magnetic storage record which is produced in the tape 20 by the action of the magnetic head 46 upon the application of the pulse signal whose waveform appears in FIGURE 3A. As previously pointed out, during the application of the recording pulse signals represented by the waveform of FIGURE 3A, the tape moves at a uniform speed with respect to the magnetic recording head 46, so that the data is recorded serially. Inasmuch as all positive zero crossovers occur at clock time intervals, they may be regarded as initiating separate storage cells which are serially adjacent in the tape channel under consideration. In FIGURE 3 the respective storage cells are labeled $C_A$, $C_B$, $C_C$ and $C_D$. Each storage cell further has 4 sub-divisions equal to the minimum distinguishable distance between a pair of opposite zero crossovers. In the case of the storage cell $C_A$ these divisions are labeled $MDD_1$, $MDD_2$, $MDD_3$ and $MDD_4$.

The polarity of the magnetic indicia resulting from the application of pulse signals represented by the waveform of FIGURE 3A to the magnetic head 46, are schematically illustrated in FIGURE 3B by means of arrows indicative of the poling of the recorded indicia. At time $t_{0A}$, a polarity reversal is seen to occur between the negative poling preceding this point and the positive poling subsequent thereto. It will be evident that the last-mentioned polarity reversal corresponds to the positive zero crossover at this point in the waveform of FIGURE 3A. At time $t_1$ another polarity reversal occurs to reverse the positive poling which prevails during the interval $MDD_1$. The last-mentioned polarity reversal corresponds to the negative zero crossover at time $t_1$ in the waveform of FIGURE 3A.

It will be noted that the aforesaid opposite polarity reversals are spaced from each other by 1 MDD and hence they may be reliably distinguished upon readout. The characteristic spacing of 1 MDD is further representative of the binary digit combination 11. The negative poling of the magentic indicia in the cell $C_A$ prevails throughout the divisional intervals $MDD_2$, $MDD_3$ and $MDD_4$ until the subsequent storage cell is initiated by a polarity reversal corresponding to the positive zero crossover at time $t_{0B}$ in FIGURE 3A, which defines the beginning of the subsequent storage cell $C_B$.

In the storage cell $C_B$, a negative polarity reversal occurs at time $t_2$ corresponding to the negative polarity zero crossover at that time in the waveform of FIGURE 3A. The characteristic spacing of 5/3 MDD between opposite polarity reversals is representative of the binary digit combination 10 in the cell $C_B$. The negative poling is thereafter maintained in the storage cell $C_B$ until the cell $C_C$ is initiated by means of a positive polarity reversal at time $t_{0C}$, croresponding to the positive zero crossover of FIGURE 3A.

The spacing 7/3 MDD of the negative polarity reversal within the storage cell $C_C$ from the positive polarity reversal which initiates the cell, is characteristic of the binary digit combination in 01, and corresponds to a similar section of the waveform of FIGURE 3A. Similarly, the spacing of the negative polarity reversal at time $t_4$ from the positive polarity reversal at time $t_{0D}$ which initiates the storage cell $C_D$, is characteristic of the binary digit combination 00 represented by the magnetic indicia in the latter cell.

A consideration of the waveform of FIGURE 3A and of the corresponding record illustrated in FIGURE 3B will disclose that the four binary digit combinations can be paired off to form palindromes so as to represent the same data when read in a forward or in a backward direction. For example, the digit combination 00 in the storage cell $C_D$, when read from right to left in the drawing, is equivalent to the digit combination 11. Similarly, when the cell $C_A$, which contains the digit combination 11, is read from right to left it is equivalent to the combination 00. In like manner the digit combination 10 and 01 are palindromic. It follows that only a simple complementing step is required in order to permit data readout in the reverse direction.

Figure 4:
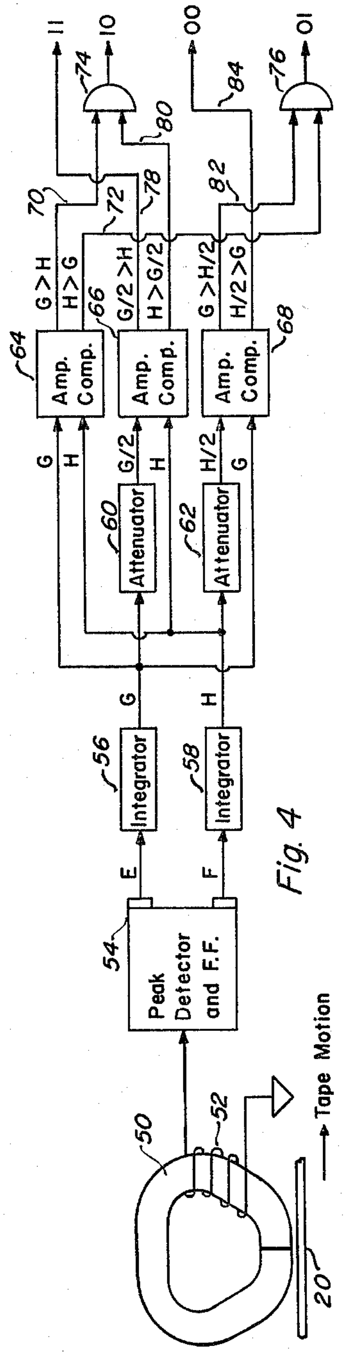
FIGURE 4 illustrates one embodiment of the readout apparatus which forms a part of the present invention.

FIGURE 4 illustrates one embodiment of apparatus for reading out and utilizing the record illustrated in FIGURE 3B. A magnetic readout head 50, which may or may not be identical with the recording head 46 of FIGURE 1, has an output winding 52 adapted to have signals induced therein as the magnetized portions of the storage medium move under the readout head. The output winding 52 is connected to a peak detector and slave flip-flop unit 54 which provides a pair of mutually inverted output signals. The respective outputs of the unit 54 are connected to a pair of integrators 56 and 58 whose outputs G and H are connected to a pair of attenuators 60 and 62 respectively, each adapted to attenuate the received signal to one-half its amplitude.

An amplitude comparator 64 has a pair of inputs connected to the integrator outputs G and H. An amplitude comparator 66 is connected to the integrator output H as well as to the output of the attenuator 60 which is labaled G/2 herein. An amplitude comparator 68 is connected to the integrator output G as well as to the output of the attenuator 62 which is labeled H/2 herein.

The amplitude comparator 64 has a pair of outputs 70 and 72 which are connected to one input leg of a pair of gates 74 and 76 respectively. The amplitude comparator 66 has a pair of outputs 78 and 80, the output 80 being connected to another input of the aforesaid gate 74. The output 78 is connected to an indicating means which is labeled 11 in FIGUURE 4. One of the outputs of the amplitude comparator 68 which is designated 82, is seen to be connected to another input leg of aforesaid gate 76. The other output of the comparator 68 is labeled 84 and is connected to an indication means which is designated 00. The output of the gate 74 is connected to an indication means which is labeled 10, while the output of the gate 76 is similarly connected to an indication means that is designated as 01.

In operation, whenever one of the polarity reversals of the record passes under the magnetic head due to the motion of the tape 20, a voltage peak of a corresponding polarity is induced in the output winding 52 and is applied to the input of the unit 54. The waveform of the induced signal corresponding to the aforesaid polarity reversal of the record is shown in FIGURE 3C. Upon application to the peak detection portion of the unit 54 a signal, such as that illustrated in FIGURE 3D is obtained and is seen to contain clipped pulses of relatively short duration corresponding to each polarity reversal of the record.

FIGURES 3E and 3F illustrate representative waveforms obtained at the outputs E and F of the slave flip-flop portion of the unit 54. These signals are applied to the integrators 56 and 58 to produce signals at the outputs of the latter which are illustrated in FIGURES 3G and 3H respectively. The waveform of FIGURE 3G corresponds to the application of the pulse signal represented by the waveform of FIGURE 3E to the integrator 56. The latter integrator provides an output signal of increasing amplitude upon the occurrence of a positive crossover such as occurs at time $t_{0A}$ in the waveform of FIGURE 3E.

The signal level at the output of the integrator G rises until time $t_1$ when a negative zero crossover terminates the positive pulse of the waveform of FIGURE 3E. Thereafter, the signal level at the output G of the integrator 56 remains constant until the integrator is discharged immediately prior to the time $t_{0B}$. It will be noted that the maximum signal level of the waveform of FIGURE 3G between the times $t_{0A}$ and $t_{0B}$ is dependent on the time interval $t_{0A}$–$t_1$ during which integration took place.

At time $t_{0B}$ the waveform E exhibits a positive zero crossover to form a positive pulse which endures until time $t_2$ whence it is terminated by a negative zero crossover. The output signal of the integrator 56 which is represented by the waveform of FIGURE 3G, accordingly exhibits a rise between $t_{0B}$ and $t_2$. The integrated signal is stored between $t_2$ and $t_{0C}$ at which time it reverts to zero. As previously pointed out, the relationship between the duration of the positive pulses of the waveform of FIGURE 3A between the times $t_{0B}$–$t_2$ and $t_{0A}$–$t_1$ is 5:3 respectively. Accordingly, the ratio of the maximum pulse amplitudes of the waveform 3G between the times $t_{0B}$–$t_{0C}$ and $t_{0A}$–$t_{0B}$ is similarly 5:3.

The conditions are similar for the subsequentially occuring clock time intervals $C_C$ and $C_D$. Thus, the waveform of FIGURE 3E exhibits positive pulses in the intervals $t_{0C}$–$t_{0D}$ and $t_{0D}$–$t_{0E}$ which have a duration of 7 and 9 respectively in accordance with the scale previously adopted. Accordingly, the maximum pulse amplitudes of the waveform of FIGURE 3G during the corresponding time intervals is 7 and 9 respectively, relative to the pulse amplitude during the preceding clock time intervals.

FIGURE 3F is a waveform respresentation of the pulse signal derived at the output F of the unit 54 in FIGURE 4. The waveform is seen to be the inverse of that illustrated in FIGURE 3E. The waveform of the signal which appears at the output H of the integrator 58 in FIGURE 4, in response to the pulse signal F applied thereto, is illustrated in FIGURE 3H. A comparison of FIGURES 3F and 3H wil show that the occurrence of a positive zero crossover at time $t_1$ in the waveform of FIGURE 3F initiates an integrating action which is continued until the time $t_{0B}$. The signal amplitude level remains constant until it drops to zero at time $t_2$. It will be noted that the time interval during which integration occurs, i.e. $t_1$–$t_{0B}$, is equivalent to the interval $t_{0D}$–$t_4$ in the case of the waveform of FIGURE 3G. Accordingly, the maximum amplitude of the waveform of FIGURE 3H during the interval $t_1$–$t_2$ is 9 in accordance with the scale previously adopted.

The waveform of FIGURE 3F exhibits another positive pulse during the interval $t_2$–$t_{0C}$. The output of the integrator 58, as shown in FIGURE 3H increases in amplitude to the maximum voltage level 7 which is maintained during the interval $t_{0C}$–$t_3$ which corresponds to a negative pulse interval of the waveform of FIGURE 3F. During the interval $t_3$–$t_{0D}$, the waveform of FIGURE 3H integrates to the level 5 which is maintained until $t_4$. Thereafter, between $t_4$ and $t_{0E}$, the waveform of FIGURE 3H integrates to the level 3.

In order to arrive at a determination of the digit combinations represented by the magnetic indicia of the record of FIGURE 3A in the respective storage cells, integrated signals represented by the waveforms of FIGURES 3G and 3H are compared either directly, or upon passing through the attenuators 60 and 62 respectively. A table is presented below showing the results of the various comparisons and using the previously mentioned amplitude levels.

| G/2 H | G H | H/2 G |
|---|---|---|
| $9/2 > 3 \rightarrow$ (11) | $9 > 3 \rightarrow 11$ or $10$ | $3/2 \not> 9 \rightarrow \overline{00}$ |
| $7/2 \not> 5 \rightarrow \overline{11}$ | $7 > 5 \rightarrow 11$ or $10$ | $5/2 \not> 7 \rightarrow \overline{00}$ |
| $5/2 \not> 7 \rightarrow \overline{11}$ | $5 \not> 7 \rightarrow \overline{11 \text{ or } 10}$ | $7/2 \not> 5 \rightarrow \overline{00}$ |
| $3/2 \not> 9 \rightarrow \overline{11}$ | $3 \not> 9 \rightarrow \overline{11 \text{ or } 10}$ | $9/2 > 3 \rightarrow$ (00) |

G H
$5 \not> 7 \rightarrow \overline{11 \text{ or } 10}$
H/2 G
$7/2 \not> 5 \rightarrow \overline{00}$
} → 01

G H
$7 \not> 5 \rightarrow 11$ or $10$
G/2 H
$7/2 \not> 5 \rightarrow \overline{11}$
} → 10

It will be noted that the binary digit combination 11 is uniquely determined from the comparison $G/2>H$, while the binary digit combination 00 is uniquely determined by the comparison $H/2>G$. In order to determine the presence of the binary digit combination 01, the results of two comparisons must coincide, specifically $G \not> H$ and $H/2 \not>$ than $G$. A determination of the presence of the binary digit combination 10 is made when $G>H$ and $G/2 \not> H$.

From the foregoing discussion it will be apparent that the apparatus required for reading out a storage record in accordance with the present invention is relatively simple in construction and in operation so as to contribute to the reliability of data readout. Since the readout operation is entirely self-clocked, no recourse is had to any external clocking source. An important feature of the present invention is the ability of the storage record to be read in both directions with relatively simple complementing equipment. As previously explained, this ability greatly contributes to the data handling capacity of the equipment and hence to the economy of operation, inasmuch as it permits the recorded data on the magnetic tape to be read out under different operating conditions. The direction of motion of the storage record which was assumed in the explanation above is such that the storage cells $C_A$ to $C_D$ appear in succession. If now the direction of motion is reversed, the storage cells $C_D$ will appear first and the record portion shown in FIGURE 3B in the space of the storage cell $C_D$ will be read out from right to left. The corresponding waveform which appears at the output of the unit 54 is illustrated in the time interval $t_{0E}$—$t_{0D}$ of the waveform shown in FIGURE 3E.

It will be noted that this waveform portion is equivalent to that appearing in the interval $t_{0A}$—$t_{0B}$ in FIGURE 3E when read from left to right. A similar situation obtains with respect to the waveform portion of FIGURE 3E which appears in the time intervals $t_{0D}$—$t_{0C}$ and $t_{0B}$—$t_{0C}$ respectively. As previously explained, the correspondence of the waveform portions is due to the palindromic construction of the waveform of FIGURE 3A. As a consequence, the information which is read out when the storage medium is moved past the magnetic reading head in the opposite direction need only be complemented in order to obtain the proper binary digit combination recorded in any given storage cell.

The readout operation is relatively independent of sustained variations of the speed of the tape medium. This is due to the fact that the ultimate determination of the binary digit combinations stored in any given storage cell is arrived at independently of any external clock, but solely as a result of the comparison of two separate maximum pulse amplitudes which are derived from the integration of the signals during different time intervals. As sustained change of the tape speed will affect both of the compared maximum pulse amplitudes in the same manner and accordingly, it will have no effect on the result of the comparison.

Figure 5:
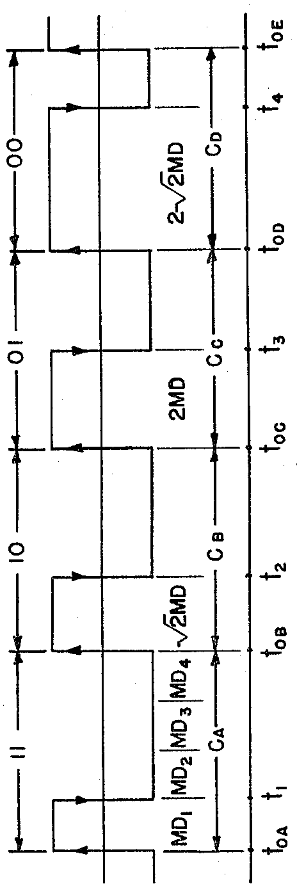
FIGURE 5 illustrates a waveform for recording the different binary digit combinations in accordance with another embodiment of the present invention.

FIGURE 5 illustrates a further embodiment of the invention with reference to the representative waveform of the recording pulse signal that is applied to the magnetic recording head. As in the case of FIGURES 2 and 3, the total length of the storage cells chosen is 4 MDD. Opposite zero crossovers in cell $C_A$ occur at the times $t_{0A}$ and $t_1$ and have a spacing of 1 MDD. The corresponding spacing in the cell $C_B$ is equal to $\sqrt{2}$ MDD, with the zero crossovers appearing at $t_{0B}$ and $t_2$ respectively. In the storage cell $C_C$ the spacing of the zero crossovers which occur at the times $t_{0C}$ and $t_3$ is exactly one-half of the length of the cell, i.e. 2 MDD. In the storage cell $C_D$, the spacing of the zero crossovers which occur at times $t_{0D}$ and $t_4$ is $2\sqrt{2}$ MDD. It will be noted that in the cell $C_D$, the zero crossover which occurs at $t_4$ is spaced 1 MDD from the subsequently occurring positive crossover which initiates the next storage cell.

From the foregoing description of the embodiment illustrated in FIGURE 5 it will be clear that the spacing of the zero crossovers for each of the four combinations of a pair of binary digits proceeds logarithmically along the abscissa of the drawing. Such an arrangement lends itself particularly to a system where the readout signals are integrated and compared against an absolute standard rather than being compared against each other in the manner described above. Thus, any variation of the speed of the storage medium which results in a variation of the time of arrival of the zero crossovers, will have a similar effect in each of the storage cells represented in FIGURE 5. As a consequence, the tolerance required of the circuit to variations of tape speed, is the same percentage of the quantity measured for each of the four possible binary digit combinations.

Figure 6:
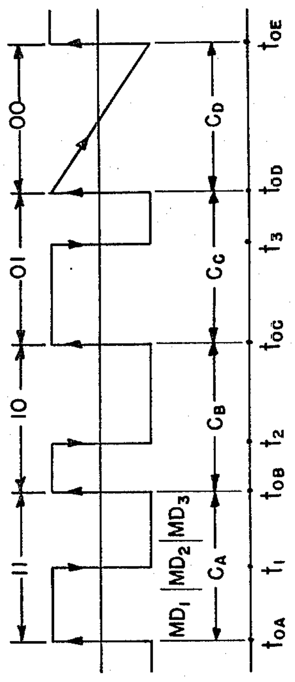
FIGURE 6 illustrates a waveform for recording the various binary digit combinations in accordance with a further embodiment of the present invention.

FIGURE 6 illustrates a further embodiment of the present invention wherein the basic storage cell has a length which is equal to 3 MDD. This is illustrated by the sub-divisions $MDD_1$, $MDD_2$ and $MDD_3$ of the cell $C_A$. It will be noted that in the present case the binary digit combination 11 has a pair of opposite polarity crossovers which occur at times $t_{0A}$ and $t_1$ and which are spaced 1.5 MDD from each other. The binary digit combination 10 which is illustrated in the storage cell $C_D$, has a pair of crossovers occurring at times $t_{0B}$ and $t_2$ which are spaced 1 MDD from each other. The binary digit combination 01 which is illustrated in the storage cell $C_C$ has a pair of opposite zero crossovers which occur at times $t_{0C}$ and $t_3$ and which have a spacing of 2 MDD. It will be further seen that the negative zero crossover is spaced 1 MDD from the positive zero crossover which initiates the next cell. Finally, the binary digit combination 00 which is illustrated in the storage cell $C_D$, employs the zero crossover which occurs at times $t_{0D}$ to initiate the cell $C_D$, as well as the zero crossover at time $t_{0E}$ which initiates the subsequent storage cell. In the latter case it will be noted that this pair of zero crossovers has a spacing of 3 MDD and has the same positive polarity. A negative polarity crossover occurs halfway therebetween but is not significant in the same sense as the zero crossovers at $t_{0D}$ and $t_{0E}$ since it does not occur abruptly. As a consequence, the readout signal resulting from the latter nonsignificant zero crossover will display a relatively small peak in this area and can be eliminated by means of amplitude discrimination.

The advantage of the storage record which is disclosed in FIGURE 6 is due primarily to its ability to compress information into a smaller space inasmuch as only 3 MDD per storage cell are required. On the other hand, it requires apparatus which is capable of recognizing a pair of significant zero crossovers of the same polarity spaced from each other by the length of a complete storage cell as representative of one combination of a pair of binary digits. Accordingly, more complex equipment is required to read out such a record.

It will be apparent from the foregoing disclosure of the various embodiments of a new and improved storage record as well as of the apparatus and the method for producing and utilizing the same, that the invention is not confined to the specific embodiments herein disclosed. For example, the various waveforms and polarity crossovers have been presented with respect to a given assumed polarity. It will be understood that a reversal of the polarity in each case will produce similar results. For example, the synchronizing zero crossover which indicates the beginning of each storage cell in the waveform of FIGURE 3A may well have a negative polarity followed by a positive zero crossover which is characteristically spaced from the negative crossover in accordance with the binary digit combination represented. Similarly, variations of the recording apparatus illustrated in FIGURE 1 may be made without departing from the concept of the present invention. The same is true for the readout apparatus of FIGURE 4, the operation of which has been described for an amplitude ratio comparison. As explained above, amplitude comparisons may be made with reference to a fixed standard or with reference to each other. It is also possible to use a time comparison with reference to a fixed time standard.

It will be apparent from the foregoing disclosure of the invention that numerous modifications, changes and equivalents will now occur to those skilled in the art, all of which fall within the true spirit and scope contemplated by the invention.

What is claimed is:

1. A storage record for binary digital information, comprising a magnetic medium having a plurality of substantially identical cells disposed serially adjacent each other, magnetic indicia recorded in each of said cells each representative of one of four possible combinations of a pair of binary digits, each of said magnetic indicia including a first significant polarity reversal to define the beginning of the corresponding cell and a second significant polarity reversal of opposite polarity from said first significant reversal and spaced therefrom by a distance which is characteristically different for each of said four digit combinations represented, the position of said polarity reversals within each cell being chosen to define palindromic pairs of said four characteristically different magnetic indicia.

2. A storage record for binary digital information, comprising a magnetic medium having a plurality of substantially identical cells disposed serially adjacent each other, each of said cells containing a plurality of substantially equal sub-divisions respectively corresponding to the minimum distinguishable spacing of a pair of opposite polarity reversals, magnetic indicia recorded in each of said cells each representative of one of four possible combinations of a pair of binary digits, each of said magnetic indicia including a first significant polarity reversal to define the beginning of the corresponding cell and a second significant polarity reversal opposite to said first polarity reversal and spaced therefrom by a distance which is respectively 3/3, 5/3, 7/3, and 9/3 times the duration of one of said time divisions in different ones of said four representative magnetic indicia.

3. A storage record for binary digital information, comprising a magnetic medium having a plurality of substantially identical cells disposed serially adjacent each other, each of said cells containing a plurality of substantially equal divisions respectively corresponding to the minimum distinguishable spacing of a pair of opposite polarity reversals, magnetic indicia recorded in each of said cells each representative of one of four possible combinations of a pair of binary digits, each of said magnetic indicia including a first significant polarity reversal to define the beginning of the corresponding cell and a second significant polarity reversal opposite to said first polarity reversal and spaced therefrom by a distance which is respectively 1, $\sqrt{2}$, 2 and $2\sqrt{2}$ times the duration of one of said time divisions in different ones of said four representative magnetic indicia.

4. A storage record for binary digital information, comprising a magnetic medium having a plurality of substantially identical cells disposed serially adjacent each other, magnetic indicia recorded in each of said cells each representative of one of the possible combinations of a pair of binary digits, each of said magnetic indicia including a first significant polarity reversal to define the beginning of the corresponding cell and a second significant polarity reversal spaced from said first polarity reversal by a distance which is characteristically different for each of the digit combinations represented.

5. A storage record for binary digital information, comprising a storage medium having a plurality of substantially identical cells disposed adjacent each other, a data representation recorded in each of said cells each corresponding to one of four possible combinations of a pair of binary digits, each of said data representations including a first significant marking to define the beginning of the corresponding cell, and a second significant marking opposite in nature to said first significant marking and spaced therefrom a distance which is characteristically different for each of the digit combinations represented, the position of said significant markings within each cell being chosen to define palindromic pairs of said four characteristically different data representations.

6. A storage record for binary digital information, comprising a storage medium having a plurality of substantially identical cells disposed adjacent each other, a data representation recorded in each of said cells each corresponding to one of the possible combinations of a pair of binary digits, each of said data representations including a first significant marking to define the beginning of the corresponding cell and a second significant marking opposite in nature to said first significant marking and spaced therefrom a distance which is characteristically different for each of the digit combinations represented.

7. A storage record for binary digital information, comprising a storage medium having a plurality of substantially identical cells disposed adjacent each other, a data representation recorded in each of said cells each corresponding to one of the possible combinations of a pair of binary digits, each of said data representations including a first significant marking to define the beginning of the corresponding cell, and a second significant marking opposite in nature to said first significant marking and spaced therefrom a distance which is characteristically different for each of the digit combinations represented, each of said cells containing a plurality of substantially equal divisions respectively corresponding to the minimum distinguishable spacing of said markings, said markings being positioned at said minimum distinguishable spacing in the data representation of at least one of said possible digit combinations.

8. The method of recording binary digital information in adjacent, substantially identical cells of a storage medium, comprising the steps of receiving binary information digits, pairing successive ones of said information digits to form one of four possible combinations of a digit pair, and transferring a data representation corresponding to each pair of said information digits to said storage medium, said transfer step including the generation on said storage medium of a first significant marking to define the beginning of the corresponding storage cell and further including the generation within said cell of a second significant marking opposite in nature to said first significant marking and spaced therefrom a distance which is characteristically different for each of the four possible digit combinations represented, the position of said significant markings within each cell being chosen to define palindromic pairs of said four characteristically different data representations.

9. The method of recording binary digital information on a storage medium, comprising the steps of providing a data representation corresponding to each of four possible combinations of a pair of binary digits, each of said data representations including first and second significant events opposite in nature and spaced from each other a distance which is characteristically different for each of the four possible combinations represented, receiving binary information digits, pairing said information digits, and transferring one of said four characteristically different data representations to said storage medium corresponding to the combination of each of said paired information digits.

10. The method of recording binary digital information on a storage medium, comprising the steps of receiving binary information digits, pairing successive ones of said information digits to form one of four possible combinations of a digit pair, and transferring a data representation corresponding to each pair of said information digits to said storage medium, said transfer step including the generation on said storage medium of first and second significant markings opposite in nature and spaced from each other a distance which is characteristically different for each of the four possible digit combinations represented.

11. The method of recording binary digital information on a storage medium, comprising the steps of receiving binary information digits, pairing successive ones of said information digits to form one of four possible combinations of a digit pair, and transferring a data representation corresponding to each pair of said information digits to said storage medium, said transfer step including the generation on said storage medium of a first significant marking to define the beginning of a storage cell adapted to contain said data representation, said transfer step further including the generation within said cell of a second significant marking opposite in nature to said first significant marking and spaced therefrom a distance which is characteristically different for each of the four possible digit combinations represented.

12. Apparatus for recording binary digital information on a storage medium, comprising means for providing a distinct pulse signal for each possible combination of a pair of binary digits, the representative waveform of each of said pulse signals having a pair of significant zero crossovers spaced to define a time interval of different duration from that of the other waveforms, and means for recording in adjacent, substantially identical cells of said storage medium pulse signals corresponding to the combination formed by pairs of successive information digits, each of said cells containing a plurality of substantially equal sub-divisions respectively corresponding to the minimum distinguishable spacing of a pair of zero crossovers, at least one of said representative waveforms including said minimum distinguishable zero crossover spacing.

13. Apparatus for recording binary digital information on a storage medium, comprising means for providing a distinct pulse signal for each of four possible combinations of a pair of binary digits, the representative waveform of each of said pulse signals having a pair of oppositely poled significant zero crossovers spaced to define a time interval of different duration from that of the waveform of the other pulse signals, and means for recording in adjacent, substantially identical cells of said storage medium pulse signals corresponding to the combinations formed by pairs of successive information digits, the position of said zero crossovers within each cell defining palindromic pairs of said four distinct waveforms with respect to readout of said medium in opposite directions.

14. Apparatus for recording binary digital information on a storage medium, comprising means for providing a distinct pulse signal for each of four possible combinations of a pair of binary digits, the representative waveform of each of said pulse signals having a pair of oppositely poled zero crossovers, and means for recording in adjacent, substantially identical cells of said storage medium pulse signals corresponding to the combinations formed by pairs of successive information digits, each of said cells containing four substantially equal sub-divisions respectively corresponding to the minimum distinguishable spacing of a pair of zero crossovers, one of said crossovers in each of said waveforms defining the termination of one cell and the initiation of the adjacent one, the crossover spacing of said four distinct waveforms being respectively 3/3, 5/3, 7/3 and 9/3 times the duration of one of said sub-divisions.

15. Apparatus for recording binary digital information on a storage medium, comprising means for providing a distinct pulse signal for each of four possible combinations of a pair of binary digits, the representative waveform of each of said pulse signals having a pair of oppositely poled zero crossovers, and means for recording in adjacent, substantially identical cells of said storage medium pulse signals corresponding to the combination formed by pairs of successive information digits, each of said cells containing four substantially equal sub-divisions respectively corresponding to the minimum distinguishable spacing of a pair of zero crossovers, one of said crossovers in each of said waveforms defining the termination of one cell and the initiation of the adjacent one, the crossover spacing of said four distinct waveforms being respectively 1, $\sqrt{2}$, 2 and $\sqrt{2}$ times the duration of one of said sub-divisions.

16. Apparatus for recording binary digital information on a storage medium, comprising means for providing a distinct pulse signal for each of four possible combinations of a pair of binary digits, the representative waveform of each of said pulse signals having a pair of oppositely poled zero crossovers, and means for recording in adjacent, substantially identical cells of said storage medium pulse signals corresponding to the combinations formed by pairs of successive information digits, each of said cells containing three substantially equal sub-divisions respectively corresponding to the minimum distinguishable spacing of a pair of zero crossovers, one of said crossovers in each of said waveforms defining the termination of one cell and the initiation of the adjacent one, the crossover spacing of said four distinct waveforms being respectively 3/3, 5/3, 7/3 and 9/3 times the duration of one of said sub-divisions.

17. Apparatus for recording binary digital information on a storage medium, comprising means for providing four distinct pulse signals each having a waveform representative of a different possible combination of a pair of binary digits, means for recording in adjacent substantially identical cells of said storage medium pulse signals corresponding to the combinations formed by pairs of successive information digits, the waveform of each of said pulse signals being initiated by a first zero crossover to define the beginning of the corresponding cell, each of said waveforms further including a second zero crossover of opposite direction from said first zero crossover and spaced therefrom by a time interval which is characteristically different in each of said four waveforms.

18. Apparatus for recording binary digital information on a storage medium, comprising means for providing four pulse signals each having a distinct waveform representative of a different possible combination of a pair of binary digits, each of said waveforms being initated by a first significant zero crossover and further including a second significant zero crossover of opposite polarity from said first significant zero crossover and occurring at a different predetermined time interval thereafter in each of said distinct waveforms, and means for recording pulse signals on said storage medium corresponding to the combinations formed by successive pairs of information digits.

19. Apparatus for recording binary digital information on a storage medium, comprising means for providing a distinct pulse signal for each possible combination of a pair of binary digits, the representative waveform of each of said pulse signals having a pair of significant zero crossovers spaced to define a time interval of different duration from that of the waveforms of the other pulse signals, and means for recording pulse signals on said storage medium corresponding to the combinations formed by pairs of successive information digits.

20. Apparatus for recording digital information on a storage medium, comprising means for providing a distinct pulse signal for each possible combination of the respective digits of a predetermined digit group, the representative waveform of each of said distinct pulse signals containing significant zero crossovers spaced to define a time interval of different duration from that of the waveforms of the other pulse signals, and means for recording pulse signals on said storage medium corresponding to the combination formed by each of said predetermined groups of successive information digits.

21. Apparatus for recording binary digital information on a storage medium, comprising means for providing a distinct pulse signal for each possible combination of a pair of binary digits, the representative waveform of each of said pulse signals having a postive and a negative zero crossover spaced to define a time interval of different duration from that of the waveforms of the other pulse signals, and means for recording pulse signals on said storage medium corresponding to the combinations formed by pairs of successive information digits.

22. Apparatus for recording binary digital information on a storage medium, comprising means for providing a distinct pulse signal for each possible combination of a pair of binary digits, the representative waveform of each of said pulse signals having a positive and a negative zero crossover spaced to define a time interval of different duration from that of the waveforms of the other pulse signals, and means for recording in adjacent, substantially identical cells of said storage medium pulse signals corresponding to the combinations formed by pairs of successive information digits.

23. Apparatus for recording binary digital information on a storage medium comprising means for providing a distinct pulse signal for each possible combination of a pair of binary digits, the representative waveform of each of said pulse signals having a pair of significant zero crossovers of opposite polarity spaced to define a time interval of different duration from that of the waveforms of the other pulse signals, and means for recording in substantially identical cells of said storage medium pulse signals corresponding to the combinations formed by pairs of successive information digits, one of each of said pair of significant zero crossovers defining the termination of one cell and the initiation of the adjacent one.

24. Apparatus for magnetically recording binary digital information in a plurality of channels on a magnetic tape, comprising a recording station including a magnetic head corresponding to each of said channels, means for applying a pulse signal to each of said heads which is characteristically different for each possible combination of a pair of binary digits, the representative waveform of each of said pulse signals having a positive and a negative zero crossover spaced to define a time interval of different duration from that of the waveforms of the other pulse signals, means for energizing each of said heads with said pulse signals corresponding to the combinations formed by pairs of successive information digits in a corresponding input channel, and means for moving said magnetic tape at a uniform rate past said recording station to record said pulse signals in each tape channel in adjacent substantially identical cells.

25. Apparatus for recording binary digital information in adjacent, substantially identical cells of at least one channel of a magnetic storage medium, comprising means associated with said channel for serially supplying paired information digits, a sub-channel corresponding to each of four possible combinations of a pair of binary digits, decoding means adapted to energize one of said sub-channels in accordance with the combination formed by each pair of incoming information digits, generating means adapted to provide distinct pulse signals each representative of one of said four digit combinations, gating means in each of said sub-channels connected to transfer one of said pulse signals from said generating means in accordance with the combination represented by the incoming pair of information digits, and a recording head adapted to be energized by said transferred pulse signal to store corresponding magnetic indicia in a separate cell of said storage medium, each of said magnetic indicia including a first polarity reversal to define the beginning of the corersponding cell and a second polarity reversal of opposite direction from said first polarity reversal and spaced therefrom a distance which is characteristically different for each of the four digit combinations represented, the position of said polarity reversals within each cell defining palindromic pairs of said four characteristically different magnetic indicia.

26. Apparatus for recording binary digital information in at least one channel of a magnetic storage medium comprising means associated with said channel for serially supplying paired information digits, a sub-channel corresponding to each one of four possible combinations of a pair of binary digits, decoding means adapted to energize one of said sub-channels in accordance with the combination formed by each pair of incoming information digits, generating means adapted to provide distinct pulse signals each representative of one of said four digit combinations, the waveform of each of said pulse signals including a pair of positive and negative significant zero crossovers spaced from each other a distance which is characteristically different for each of the digit combinations represented, gating means in each of said sub-channels connected to transfer one of said pulse signals from said generating means to a common output in accordance with the combination represented by the incoming pair of information digits, and a recording head adapted to be energized by said transferred pulse signal to store corresponding magnetic indicia in said storage medium.

27. The apparatus of claim 26 wherein information is recorded in a plurality of channels of said storage medium, said generating means being connected to supply pulse signals to the gating means disposed in all the sub-channels associated with each of said plurality of storage medium channels.

28. Apparatus for reading out magnetic indicia serially recorded in adjacent cells of a magnetic storage medium and respectively representative of a possible combination of a pair of binary digits, each of said magnetic indicia having a first significant polarity reversal defining the beginning of a cell and a second significant polarity reversal of opposite direction spaced from said first significant polarity reversal a distance characteristic of the digit combination represented, comprising means for moving said storage medium past a readout station, a magnetic head positioned at said readout station adapted to provide an electrical pulse of a corresponding polarity upon the occurrence of each of said polarity reversals, peak detection and flip-flop means responsive to said electrical pulses to provide a pair of complementary signals, each of said complementary signals including pulses of a duration equivalent to the spacing of the polarity reversals of the originating magnetic indicia, means for integrating said last-recited pulses, and means for comparing the amplitudes of the output signals of said integration means to determine the combination of the digit pair represented by said originating magnetic indicia.

29. Apparatus for reading out magnetic indicia serially recorded in adjacent cells of a magnetic storage medium and respectively representative of a possible combination of a pair of binary digits, each of said magnetic indicia having a first significant polarity reversal defining the beginning of a cell and a second significant polarity reversal of opposite direction spaced from said first significant polarity reversal a distance characteristic of the digit combination represented, comprising means for moving said storage medium past a readout station, a magnetic head positioned at said readout station adapted to provide an electrical pulse of a corresponding polarity upon the occurrence of each of said polarity reversals, peak detection and flip-flop means responsive to said electrical pulses to provide a pair of complementary signals, each of said complementary signals including pulses of a duration equivalent to the spacing of the polarity reversals of the originating magnetic indicia, means for integrating said last-recited pulses, and means for comparing the amplitudes of the output signals of said integration means against a reference voltage to determine the combination of the digit pair represented by said originating magnetic indicia.

30. Apparatus for reading out magnetic indicia serially recorded in adjacent cells of a magnetic storage medium and respectively representative of a possible combination of a pair of binary digits, each of said magnetic indicia having a first significant polarity reversal defining the beginning of a cell and a second significant polarity reversal of opposite direction spaced from said first significant polarity reversal a distance characteristic of the digit combination represented, comprising means for moving said storage medium past a readout station, a magnetic head positioned at said readout station adapted to provide an electrical pulse of a corresponding polarity upon the occurrence of each of said polarity reversals, peak detection and flip-flop means responsive to said electrical pulses to provide a pair of complementary signals, each of said complementary signals including pulses of a duration equivalent to the spacing of the polarity reversals of the originating magnetic indicia, and means for comparing the duration of said last-recited pulses against a predetermined reference to determine the combination of the digit pair represented by said originating magnetic indicia.

References Cited by the Examiner

UNITED STATES PATENTS

| | | | |
|---|---|---|---|
| 2,887,674 | 5/1959 | Greene ------------ | 340—174.1 |
| 3,226,685 | 12/1965 | Potter et al. -------- | 340—174.1 |

BERNARD KONICK, *Primary Examiner.*

A. I. NEUSTADT, *Assistant Examiner.*